United States Patent [19]

Steyn

[11] Patent Number: 5,195,860
[45] Date of Patent: Mar. 23, 1993

[54] PUSH-ON TYPE FASTENER FOR AUTOMATIC FEED AND INSTALLATION EQUIPMENT

[75] Inventor: Willem J. Steyn, Jackson, N.J.

[73] Assignee: TRW Inc., Cleveland, Ohio

[21] Appl. No.: 916,512

[22] Filed: Jul. 20, 1992

[51] Int. Cl.$^5$ .................. F16B 21/18; F16B 37/16
[52] U.S. Cl. .................. 411/526; 411/353; 411/437; 411/918
[58] Field of Search ............ 411/352, 353, 437, 512, 411/525, 526, 527, 918

[56] References Cited

U.S. PATENT DOCUMENTS

| | | |
|---|---|---|
| 1,602,217 | 10/1926 | Wessel . |
| 2,321,157 | 6/1943 | Rees . |
| 2,375,728 | 5/1945 | Cadwallader ............... 411/918 X |
| 2,643,721 | 6/1953 | Arbuckle .................. 411/918 X |
| 2,975,667 | 3/1961 | Bross . |
| 3,036,793 | 5/1962 | Becker ..................... 411/526 X |
| 3,102,508 | 1/1963 | Smith, Jr. .................. 411/918 X |
| 3,212,391 | 10/1965 | Duffy . |
| 3,326,509 | 6/1967 | Kuttler . |
| 3,572,218 | 3/1971 | Gumtow . |
| 3,631,757 | 1/1972 | Parkin . |
| 3,924,955 | 12/1975 | Barnett et al. . |

FOREIGN PATENT DOCUMENTS

| | | |
|---|---|---|
| 701277 | 1/1941 | Fed. Rep. of Germany . |
| 842350 | 6/1939 | France . |

Primary Examiner—Neill R. Wilson
Attorney, Agent, or Firm—Fay, Sharpe, Beall, Fagan, Minnich & McKee

[57] ABSTRACT

A pushnut fastener for engagement on a cylindrical stud and particularly suited for conveying to the point of use through automatic feed systems comprises a metal body of relatively thin, uniform thickness having oppositely facing first and second exterior surfaces and a circular radial outer marginal periphery. A central opening extends axially through the body between the oppositely facing exterior surfaces and defines a generally circular inner marginal periphery having resilient finger-like engagement portions for engaging and gripping the exterior of the cylindrical stud. The finger-like engagement portions are inclined to extend laterally of the body outwardly of the first exterior surface a maximum distance of d. A circumferentially continuous cylindrical peripheral flange is formed on the radial outer marginal periphery to extend generally perpendicular to the first exterior surface and terminate in a continuous free end which lies entirely in a plane parallel to the first exterior surface outwardly thereof a distance D which is substantially greater than d. The outer free end is smooth and radiused on the radial inner edge. A relatively large transition radius extends completely about the radial outer marginal periphery between the second face and the circumferentially continuous peripheral flange.

7 Claims, 2 Drawing Sheets

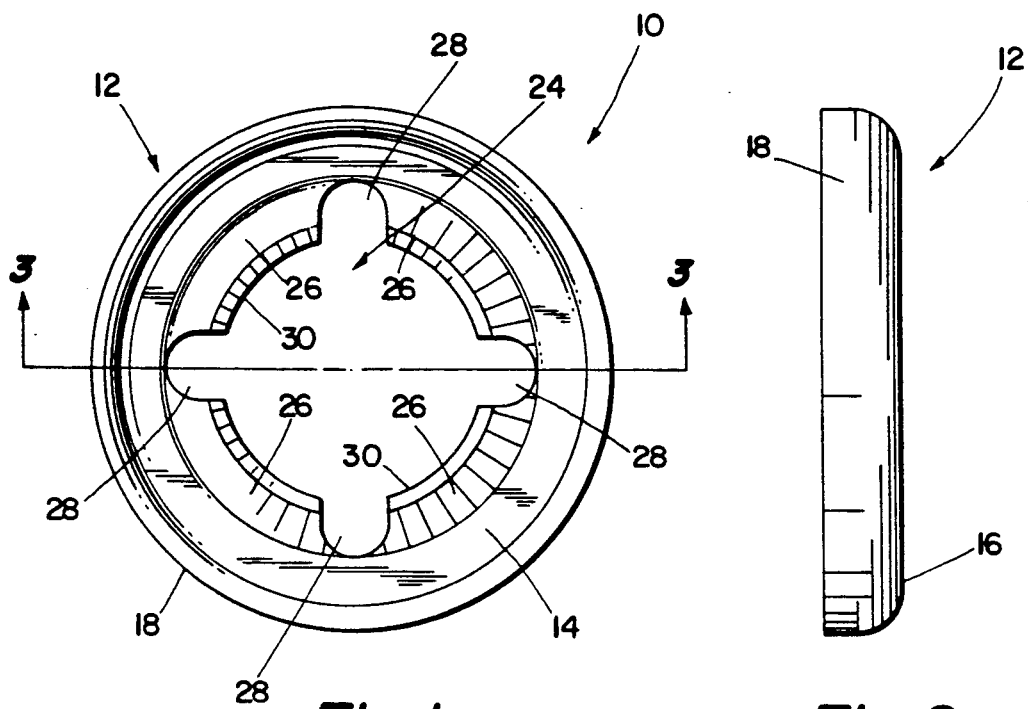
Fig. 1
Fig. 2
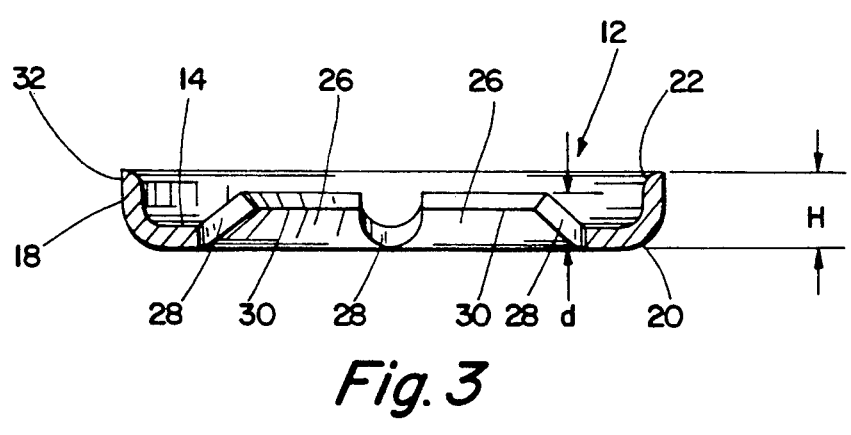
Fig. 3
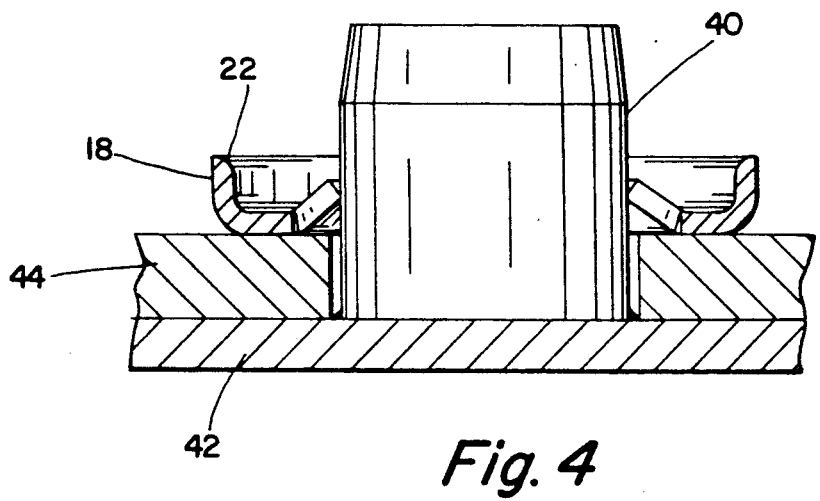
Fig. 4

PUSH-ON TYPE FASTENER FOR AUTOMATIC FEED AND INSTALLATION EQUIPMENT

BACKGROUND OF THE INVENTION

The subject invention is directed to a push-on type metal fastener which can be axially forced into engaged position on cylindrical rods or studs.

The invention is especially suited for forming push-on fasteners that can be fed to the point of use through flexible feed tubes and applied using automatic applicator tools and will be described with reference thereof; however, as will become apparent, fasteners of the invention can equally well be transferred and applied manually.

Push-on type fasteners are well known and widely used for securing and joining various components to unthreaded studs and rods. Normally, the fasteners are transferred and installed using simple manually manipulated tools. The design of the prior fasteners is such that the fasteners cannot be readily fed and applied using automatic orienting, conveying, and installing equipment.

BRIEF STATEMENT OF THE INVENTION

The subject invention provides a fastener of the push-on type which is efficient and strong and which has a configuration that is especially suited for use in automatic feed systems. The design is such that the fasteners can be oriented in conventional vibratory bowl orienting equipment. In addition, the exterior configuration and surface design of the fasteners allows them to be freely moved through extruded flexible conveying tubes by blowing them therethrough using pressurized air.

In accordance with the subject invention, there is provided a pushnut fastener which is intended for engagement on a cylindrical stud and is particularly suited for being conveyed to the point of use through automatic feed systems. According to the preferred form of the invention, the pushnut comprises a metal body of relatively thin, uniform thickness having oppositely facing first and second exterior surfaces and a circular, radial outer marginal periphery. A central opening extends axially through the body between the oppositely facing exterior surfaces. The central opening defines a generally circular inner marginal periphery having resilient finger-like engagement portions for engaging and gripping the exterior of a cylindrical stud. The finger-like engagement portions are inclined to extend laterally of the body outwardly of the first exterior surface a maximum distance of d. A circumferentially continuous cylindrical peripheral flange is formed on the radial outer marginal periphery to extend generally perpendicular to the first exterior surface. The peripheral flange terminates in a continuous free end which lies entirely in a plane parallel to the first exterior surface outwardly thereof a distance D which is substantially greater than d. The outer free end is smooth and is radiused on the radial inner edge thereof. A relatively large transition radius is formed completely about the radial outer marginal periphery and joins between the second face and the circumferentially continuous peripheral flange.

The use of the outer peripheral flange of a height greater than the maximum lateral extent of the gripping fingers assures that the gripping fingers are in a concealed or enclosed position relative to the exterior envelope or profile of the fastener. This allows the fastener to be moved through air supply tubes to the point of use much more readily and without presenting points or surfaces that could become snagged or caught on the conveying equipment. Additionally, the cylindrical flange and the large transition radius provide an exterior configuration and shape which is particularly suited for orienting the fastener in relatively conventional vibrating bowl type orienting and feeding devices. In addition, the shape produces a fastener that is significantly more rigid than prior fasteners of this general type.

Preferably, and in accordance with a more limited aspect of the invention, the fastener is formed using a sequence of punching and shearing operations such that the final shearing of the fastener structure from the sheet metal stock from which it is formed takes place to leave a cut surface only on the radial outer face of the peripheral marginal flange. Thus, the outer free end of the peripheral flange is formed by the radius on the radial inner edge.

As can be seen from the foregoing, the primary object of the invention is the provision of a pushnut type fastener wherein the fastener has an overall shape and design which allows it to be efficiently used in automatic feed and handling equipment.

A still further object is the provision of a push-on type fastener of the general type described which is capable of being readily oriented in conventional vibrating bowl type orienting and feed devices.

BRIEF DESCRIPTION OF THE DRAWINGS

The above and other objects and advantages will become apparent from the following description when read in conjunction with the accompanying drawings wherein:

FIG. 1 is a top plan view of a push-on type fastener formed in accordance with a preferred embodiment of the invention;

FIG. 2 is a side view of the fastener of FIG. 1;

FIG. 3 is a cross-sectional view taken on line 3—3 of FIG. 1;

FIG. 4 is a vertical cross-sectional view showing the fastener of FIG. 1 in use on a stud member;

DETAILED DESCRIPTION OF THE PREFERRED EMBODIMENT

Figure 5:
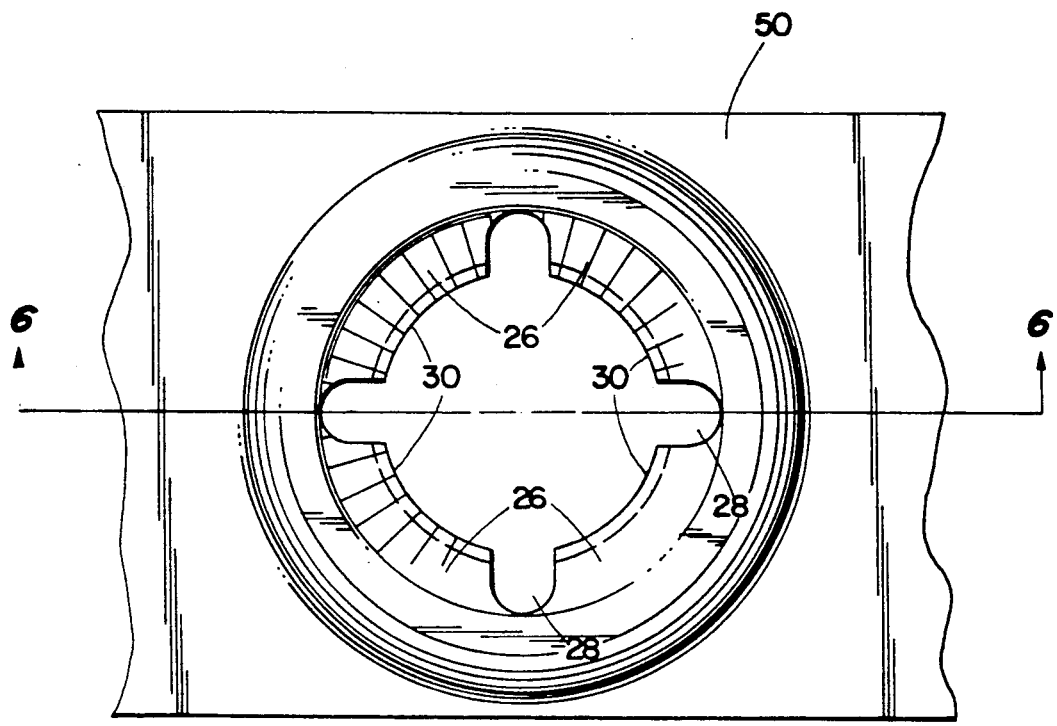
FIG. 5 is a plan view of the fastener of FIG. 1 at a stage in its manufacture; and, FIG. 6 is a cross-sectional view taken on line 6—6 of FIG. 5.

Referring more particularly to the drawings wherein the showings are for the purpose of illustrating a preferred embodiment of the invention only, and not for the purpose of limiting same, FIGS. 1 through 3 show the overall arrangement of a push-on type fastener or pushnut member 10 which incorporates the subject invention and which generally comprises a circular, generally flat and relatively thin body 12 formed from a comparatively highstrength sheet metal, such as spring steel. The circular body 12 is provided with oppositely facing first and second exterior surfaces 14 and 16 and a circular marginal peripheral edge portion which joins the opposed surfaces 14, 16.

The marginal peripheral edge portion constitutes a continuous cylindrical flange 18 which is formed integrally of the body 12 and extends preferably perpendicular to the surfaces of 14, 16. A relatively large transition radius, best seen in FIGS. 2 and 3, extends between the central portion of the body 12 and the associated peripheral cylindrical flange 18. The transition radius is indicated generally with the reference numeral 20 and preferably is of a radius at least substantially half as great as the total height H of the flange 18.

The outer peripheral free end of the flange 18 is provided with a small radius at its radial inner corner. This radius is identified with the numeral 22 and preferably is of a length substantially equal to the total radial thickness of flange 18. Additionally, it should be noted that flange s is substantially equal in thickness to the central body portion of the fastener 10.

Extending axially through the body 12 between the opposed exterior faces 14 and 16 is a central opening 24. The opening 24 is sized with relationship to the stud element to which the fastener is ultimately to be applied in a manner subsequently to be described. The opening 24 preferably has a generally circular configuration and has an inner marginal periphery that is defined by a plurality of individual finger-like extensions or tabs 26.

As best seen in FIG. 3, the tabs 26 are deflected and inclined upwardly from the lower face 16 and cooperate to define a somewhat conical shape about the margin of the opening 24. The individual finger-like tabs 26 are separated from one another by somewhat circular recesses 28.

The outer free ends of each of the finger-like tabs 26 are preferably provided with relatively sharp edge corners 30 which extend radially inward to a diametrically opposed location which is at least slightly smaller in diameter than the diameter of the stud on which the fastener is intended to be used.

It is important to note that the total height or deflected distance d of the individual finger-like tabs 26 is such that they do not extend beyond the outer free end of the circumferentially extending peripheral flange 18. Thus, the tabs are generally located entirely within the outer envelope of the overall fastener body 12. That is, the finger-like tabs 26 are generally recessed within the flange 18 to a position wherein they cannot snag or hook on associated conveying surfaces or when conveyed through air type supply tubes will not engage the walls of the tube. Rather, the entire outer envelope area of the fastener serves as the guide surface during conveying of the fastener through use feed tubes.

FIG. 4 illustrates the fastener in use on a stud member 40. Merely by way of example and illustration, stud member 40 is a smooth surfaced cylindrical stud which extends from a subjacent support element 42 outwardly and has a component element 44 carried loosely thereon. The fastener is moved into position on stud member 40 by deflecting the finger-like tab members 26 upwardly a slight distance and creating gripping engagement between the corners 30 on the free ends of the finger-like tabs 26 and the exterior surface of the stud 40. This is shown in FIG. 4 and, as can be seen, attempts to separate the components result in a camming or toggle-like action of the tabs 26 to increase the engagement and gripping with the stud 40. This particular type of locking engagement is standard with a push-on type fastener of the general class under discussion. With respect to the subject fastener, it should be noted that the peripheral flange 18 greatly strengthens the fastener against bending and results in high strength even though manufactured from a relatively thin sheet metal. In addition to the strength increase that results from the flange, the flange also provides an axially extending exterior surface which facilitates alignment and movement through chucks and collets of application tools and equipment.

To further improve the overall functioning of the fastener and to assure that the exterior surfaces which are most likely to engage during transfer through automatic handling equipment are smooth and do not present ragged or rough edges, a preferred manufacturing sequence is used. This manufacturing sequence can best be understood by reference to FIGS. 5 and 6. As is customary, the fastener is formed in a series of steps from sheet metal strips using standard punching and forming presses. However, in the subject arrangement, the fastener is completely formed to the stage illustrated in FIGS. 5 and 6 while it is still in the original strip 50. Thus, the strip of sheet metal 50 is used to convey the entire fastener throughout the forming sequence with the cylindrical shape and configuration of the fastener being formed before the fastener is cut from the sheet. As shown in FIG. 6, the entire fastener body is completed within the strip 50 while it is still joined to the outer peripheral marginal flange 18. Thus, the fastener is maintained under full control in the strip while the forming operations take place.

Figure 6:
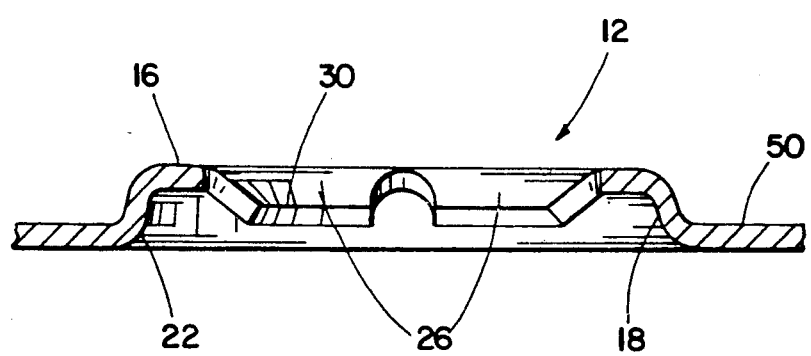

After it has been formed to the stage shown in FIGS. 5 and 6, it is then sheared from the strip using a cylindrical shearing punch arrangement to thus form a cut edge surface as shown in FIG. 3. Note that the outer free exterior end surface 32 is the only exposed exterior cut surface on the fastener. This further reduces the possibility of irregular or ragged edges on exterior surfaces on the fastener. Additionally, as noted earlier, since the fastener is maintained entirely under control in the strip, the manufacturing problems especially in the smaller sizes is greatly eliminated and reduced.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed is:

1. A pushnut fastener for engagement on a cylindrical stud and particularly suited for conveying to the point of use through automatic feed systems, the pushnut comprising:

a metal body of relatively thin, uniform thickness having oppositely facing first and second exterior surfaces and a circular radial outer marginal periphery;

a central opening extending axially through the body between the oppositely facing exterior surfaces and defining a generally circular inner marginal periphery having resilient finger-like engagement portions for engaging and gripping the exterior of the cylindrical stud, the finger-like engagement portions being inclined to extend laterally of the body outwardly of the first exterior surface a maximum distance of d;

a circumferentially continuous cylindrical peripheral flange formed on the radial outer marginal periphery extending generally perpendicular to the first exterior surface and terminating in a continuous free end which lies entirely in a plane parallel to the first exterior surface outwardly thereof a distance D which is substantially greater than d, the outer free end being smooth and being radiused on the radial inner edge thereof; and, a relatively large transition radius completely about the radial outer marginal periphery joining between the second face and the circumferentially continuous peripheral flange.

2. The pushnut fastener as defined in claim 1 wherein the continuous peripheral flange has a radial outer surface which is generally perpendicular to the second exterior surface and joined therewith by the large transition radius with the axial outer surface of the continuous peripheral flange being a surface resulting from a shearing operation used during the forming of the pushnut fastener.

3. The pushnut fastener as defined in claim 1 wherein the diameter of the outer marginal periphery is greater than the height of the continuous peripheral flange.

4. The pushnut fastener as defined in claim 1 wherein the size of the transition radius joining between the second face and the circumferentially continuous peripheral flange is a plurality of times greater than the size of the radius on the radial inner edge of the free end of the peripheral flange.

5. The pushnut fastener as defined in claim 4 wherein the size of the radius on the radial inner edge of the peripheral flange is nearly equal to the radial thickness of the peripheral flange.

6. The pushnut fastener as defined in claim 5 wherein the continuous peripheral flange has a radial outer surface which is generally perpendicular to the second exterior surface, at least the axial outermost end portion of the radial outer surface being a cut surface resulting from a shearing operation used during forming of the pushnut fastener.

7. The pushnut fastener as defined in claim 6 wherein the cut surface is continuous about the flange and has an axial length substantially equal to the radial thickness of the peripheral flange.

* * * * *